United States Patent
Ryu

(10) Patent No.: US 10,781,874 B2
(45) Date of Patent: Sep. 22, 2020

(54) CALIPER NOISE PREVENTION DEVICE FOR VEHICLE BRAKE

(71) Applicant: HYUNDAI MOBIS CO., LTD., Seoul (KR)

(72) Inventor: Sang Hyup Ryu, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 147 days.

(21) Appl. No.: 15/974,242

(22) Filed: May 8, 2018

(65) Prior Publication Data
US 2018/0328428 A1    Nov. 15, 2018

(30) Foreign Application Priority Data
May 10, 2017    (KR) .......................... 10-2017-0057959

(51) Int. Cl.
| | |
|---|---|
| *F16D 65/097* | (2006.01) |
| *F16D 65/02* | (2006.01) |
| *F16D 65/00* | (2006.01) |
| *F16D 55/226* | (2006.01) |

(52) U.S. Cl.
CPC ....... *F16D 65/0972* (2013.01); *F16D 55/226* (2013.01); *F16D 65/0006* (2013.01); *F16D 65/02* (2013.01); *F16D 65/0075* (2013.01); *F16D 65/0081* (2013.01)

(58) Field of Classification Search
CPC ............... F16D 65/0972; F16D 55/226; F16D 65/0006; F16D 65/02; F16D 65/0075; F16D 65/0081

USPC .......... 188/73.38, 73.37, 73.35, 73.36, 71.1, 188/250 D
See application file for complete search history.

(56) References Cited

U.S. PATENT DOCUMENTS

| | | | | |
|---|---|---|---|---|
| 4,445,594 | A * | 5/1984 | Hoffman, Jr. ......... | F16D 55/224 188/234 |
| 5,746,292 | A * | 5/1998 | Tanaka ................... | F16D 55/227 188/250 E |
| 5,860,495 | A * | 1/1999 | Weiler ................ | F16D 65/0979 188/73.38 |
| 6,742,632 | B2 * | 6/2004 | Treyde .................... | F16D 65/00 188/1.11 E |
| 7,178,641 | B2 * | 2/2007 | Kang ................... | F16D 65/0012 188/73.38 |
| 10,378,597 | B2 * | 8/2019 | Choi ................... | F16D 65/0068 |
| 2009/0255766 | A1 * | 10/2009 | Kappagantu ........ | F16D 65/0018 188/73.37 |
| 2019/0063522 | A1 * | 2/2019 | Ryu .................... | F16D 65/0068 |

FOREIGN PATENT DOCUMENTS

KR    10-2011-0140004    12/2011

* cited by examiner

*Primary Examiner* — Pamela Rodriguez
(74) *Attorney, Agent, or Firm* — H.C. Park & Associates, PLC

(57) ABSTRACT

A caliper noise prevention device for a vehicle brake may include: a caliper body coupled to a torque member having a friction pad installed therein; a plate disposed so as to face the caliper body; a spacer disposed between the caliper body and the plate, and isolating the caliper body and the plate from each other using an elastic restoring force; and a coupling configured to couple the spacer, the plate and the caliper body to one another.

8 Claims, 14 Drawing Sheets

CALIPER NOISE PREVENTION DEVICE FOR VEHICLE BRAKE

CROSS-REFERENCES TO RELATED APPLICATION

This application claims priority from and the benefit of Korean Patent Application No. 10-2017-0057959, filed on May 10, 2017, which is hereby incorporated by reference for all purposes as if set forth herein.

BACKGROUND

Field

Exemplary embodiments relate to a caliper noise prevention device for a vehicle brake, and more particularly, to a caliper noise prevention device for a vehicle brake, which can prevent noise between a caliper body and a plate during braking or driving of a vehicle.

Discussion of the Background

In general, an automotive disc brake uses a caliper having a pair of friction pads to strongly press a disc from both sides, the disc rotating with a wheel. Such a caliper is coupled to a plate having an emblem printed thereon, the emblem containing manufacturer information of the brake. When a vehicle is braked or driven, vibration may be generated to cause the caliper and the plate to collide with each other. In this case, noise may occur. Therefore, there is a demand for a device capable of solving the problem.

The above information disclosed in this Background section is only for enhancement of understanding of the background of the invention and, therefore, it may contain information that does not constitute prior art.

SUMMARY

Exemplary embodiments of the present invention are directed to a caliper noise prevention device for a vehicle brake, which can prevent noise between a caliper body and a plate during braking or driving of a vehicle.

Additional features of the invention will be set forth in the description which follows, and in part will be apparent from the description, or may be learned by practice of the invention.

An exemplary embodiment of the present invention discloses a caliper noise prevention device for a vehicle brake may including: a caliper body coupled to a torque member having a friction pad installed therein; a plate disposed so as to face the caliper body; a spacer disposed between the caliper body and the plate, and isolating the caliper body and the plate from each other using its elastic restoring force; and a coupling part coupling the spacer, the plate and the caliper body to one another.

The spacer may include: a first spacer portion disposed between the caliper body and the plate; and a second spacer portion extended from the first spacer portion toward one side. The first spacer portion may be brought in contact with any one of the caliper body and the plate, and the second spacer portion may be brought in contact with the other one of the caliper body and the plate.

The first spacer portion elastically supports any one of the caliper body and the plate, and the second spacer portion elastically supports the other one of the caliper body and the plate, in order to isolate the caliper body and the plate from each other.

The first spacer portion may include: a first spacer portion body having the second spacer portion formed therein; a coupling piece having a second coupling hole formed at a position facing a first coupling hole of the plate; and a connection piece disposed between the first spacer portion body and the coupling piece, and connecting the first spacer portion body and the coupling piece to each other.

The first spacer portion body may be symmetrically formed with respect to the connection piece.

The first spacer portion body may include a plurality of second spacer portions which are disposed so as to be isolated from each other.

The plurality of second spacer portions may be arranged in a longitudinal direction in a line on the first spacer portion body.

The first spacer portion may be brought in contact with the caliper body, and the second spacer portion may be extended toward the plate so as to come in contact with the plate.

The plate may have an insertion groove into which the second spacer portion is inserted.

The first spacer portion may be brought in contact with the plate, and the second spacer portion may be extended toward the caliper body so as to come in contact with the caliper body.

The caliper body may have an insertion groove into which the second spacer portion is inserted.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
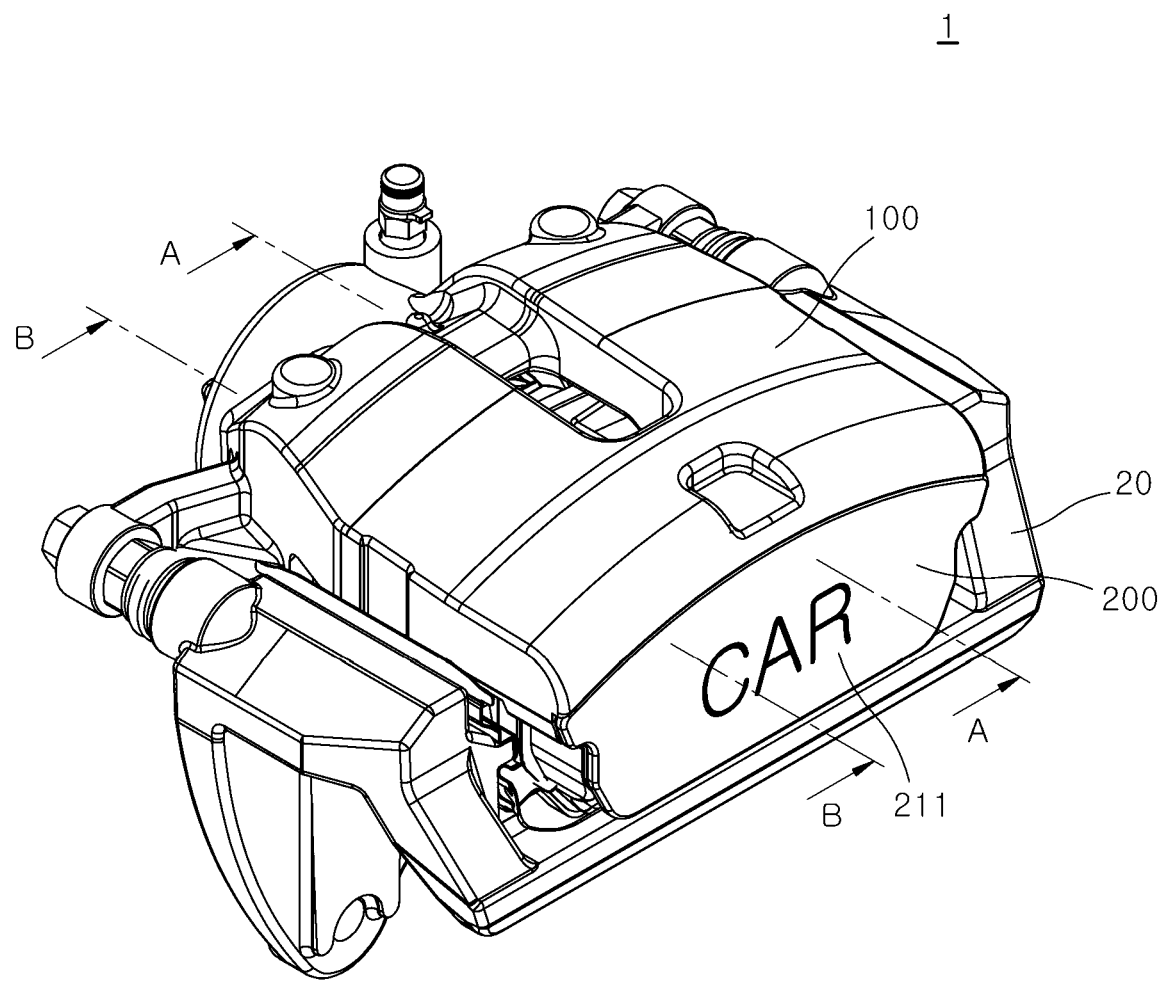
FIG. 1 is a perspective view of a caliper noise prevention device for a vehicle brake in accordance with an embodiment of the present invention.

The invention is described more fully hereinafter with reference to the accompanying drawings, in which embodiments of the invention are shown. This invention is may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

Various advantages and features of the present invention and methods accomplishing thereof will become apparent from the following description of embodiments with reference to the accompanying drawings. However, the present invention is not be limited to the embodiments set forth herein but may be implemented in many different forms. The present embodiments may be provided so that the disclosure of the present invention will be complete, and will fully convey the scope of the invention to those skilled in the art and therefore the present invention will be defined within the scope of claims. Like reference numerals throughout the description denote like elements.

Unless defined otherwise, it is to be understood that all the terms (including technical and scientific terms) used in the specification has the same meaning as those that are understood by those who skilled in the art. Further, the terms defined by the dictionary generally used should not be ideally or excessively formally defined unless clearly defined specifically. It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

Hereinafter, exemplary embodiments of the present invention will be described in more detail with reference to the accompanying drawings.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 2:
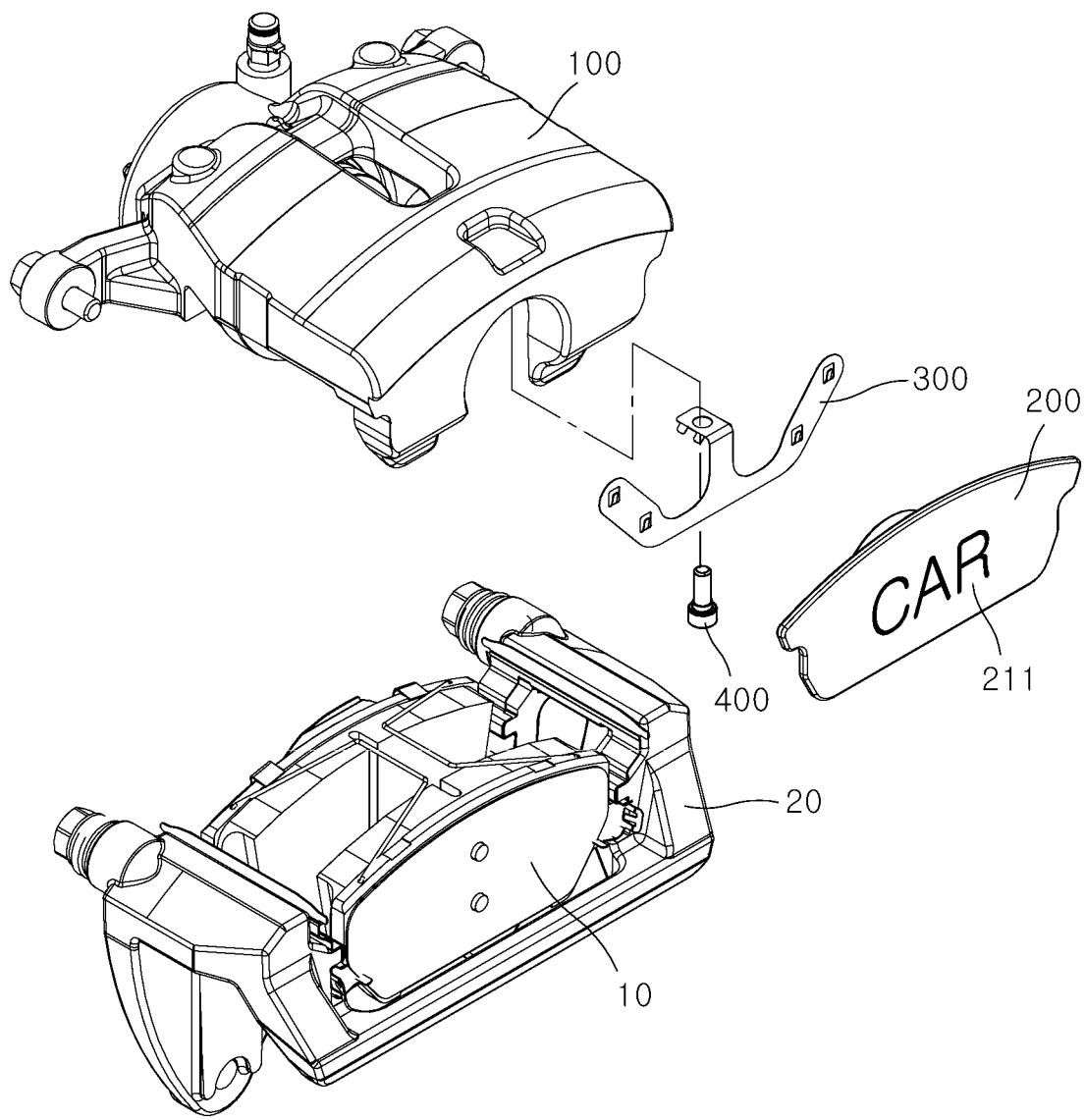
FIG. 2 is an exploded perspective view of a caliper noise prevention device for a vehicle brake in accordance with a first embodiment of the present invention.
Figure 3:
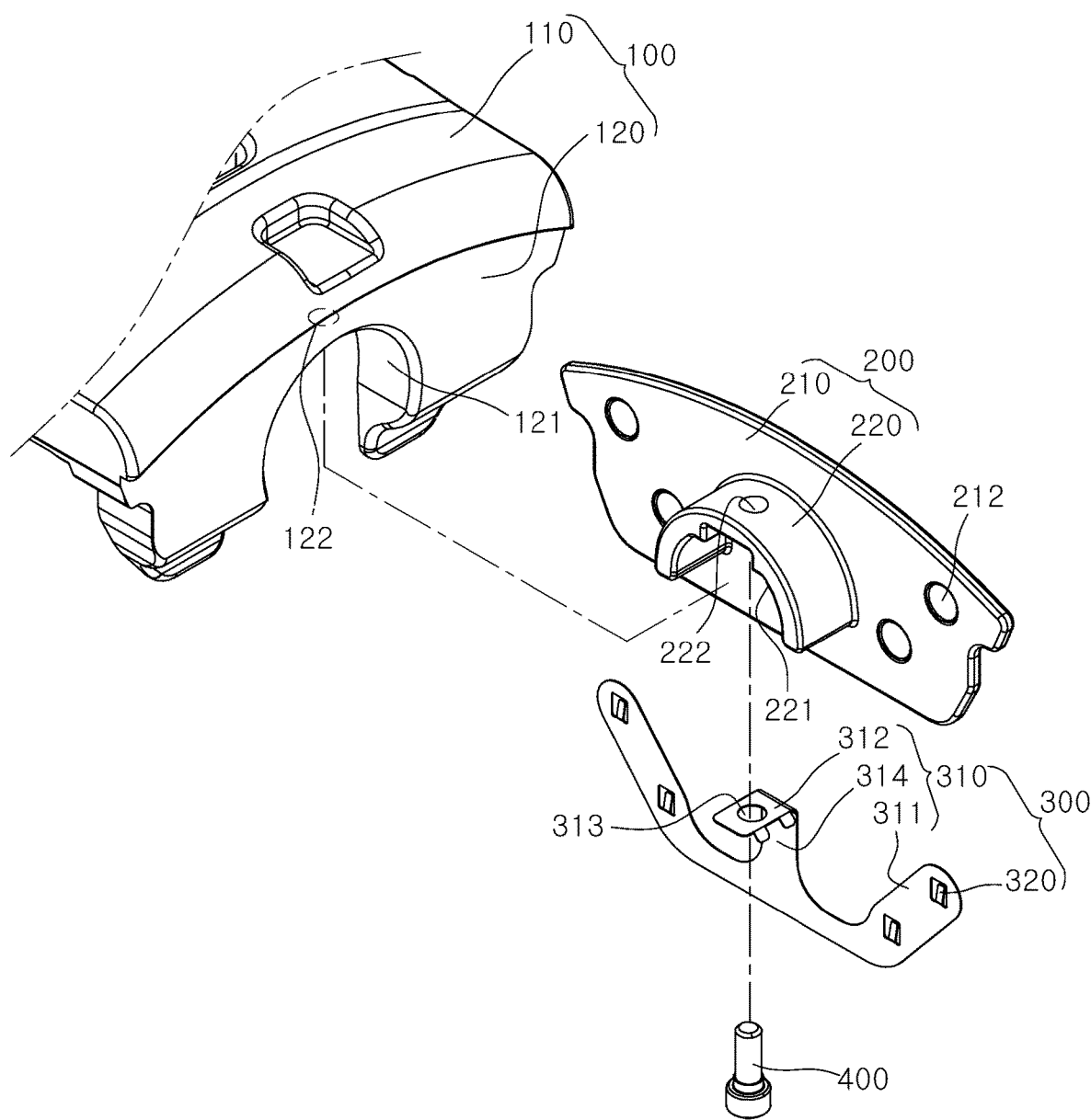
FIG. 3 is an exploded perspective view of main parts of the caliper noise prevention device for a vehicle brake in accordance with the first embodiment of the present invention.
Figure 4:
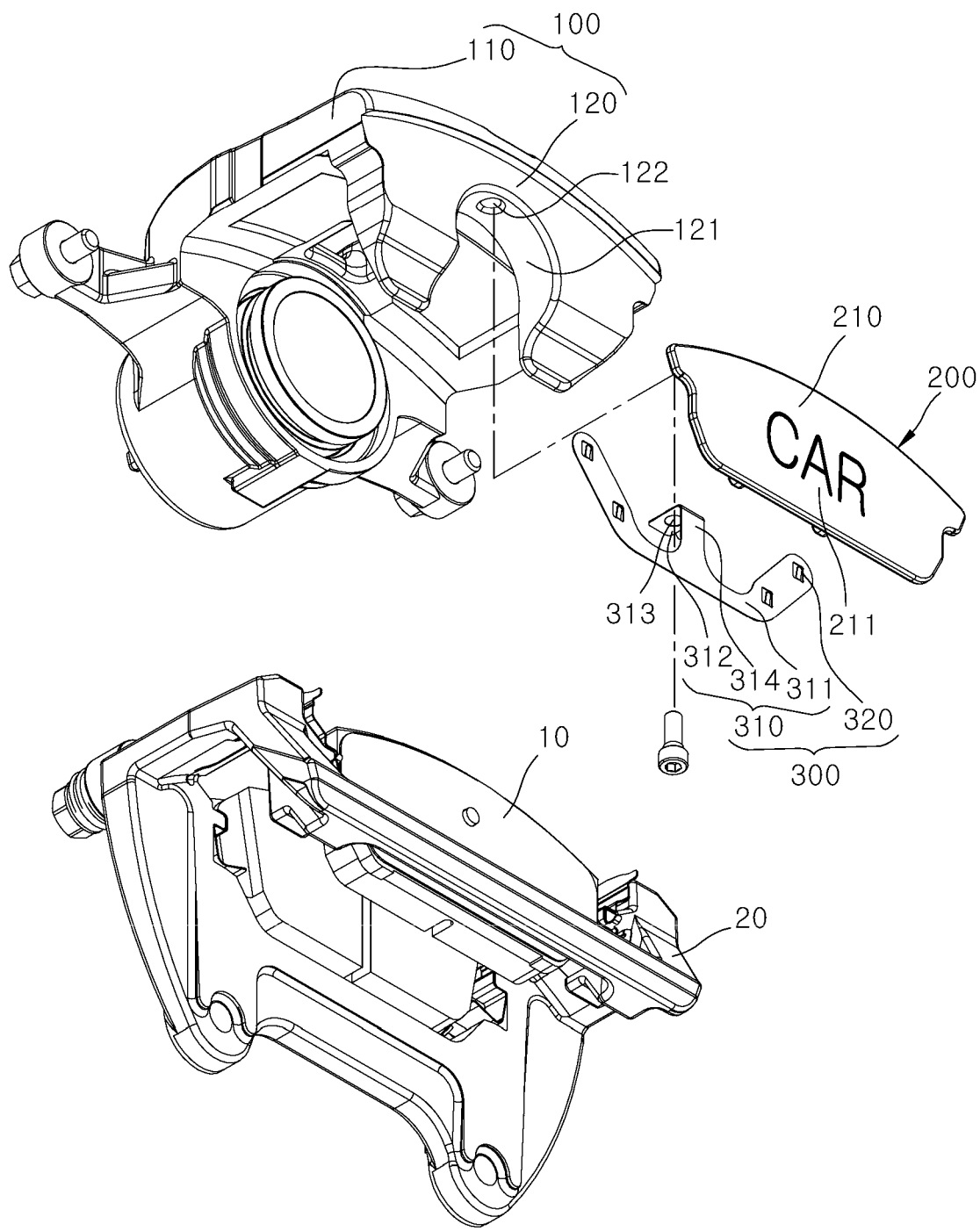
FIG. 4 is an exploded perspective view of the caliper noise prevention device for a vehicle brake in accordance with the first embodiment of the present invention, when seen from the bottom.
Figure 5:
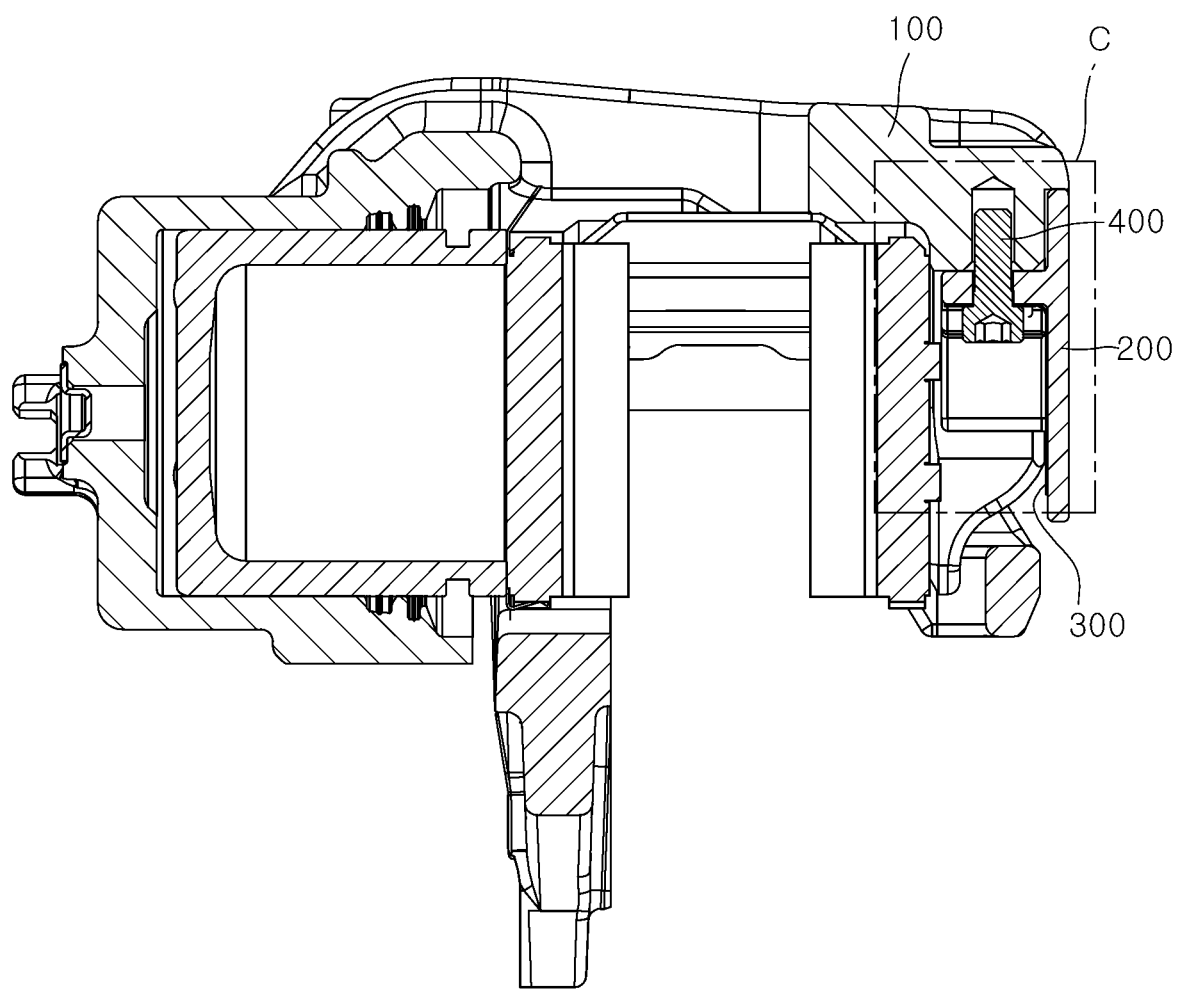
FIG. 5 is a cross-sectional view of the caliper noise prevention device for a vehicle brake in accordance with the first embodiment of the present invention, taken along the line A-A of FIG. 1.
Figure 6:
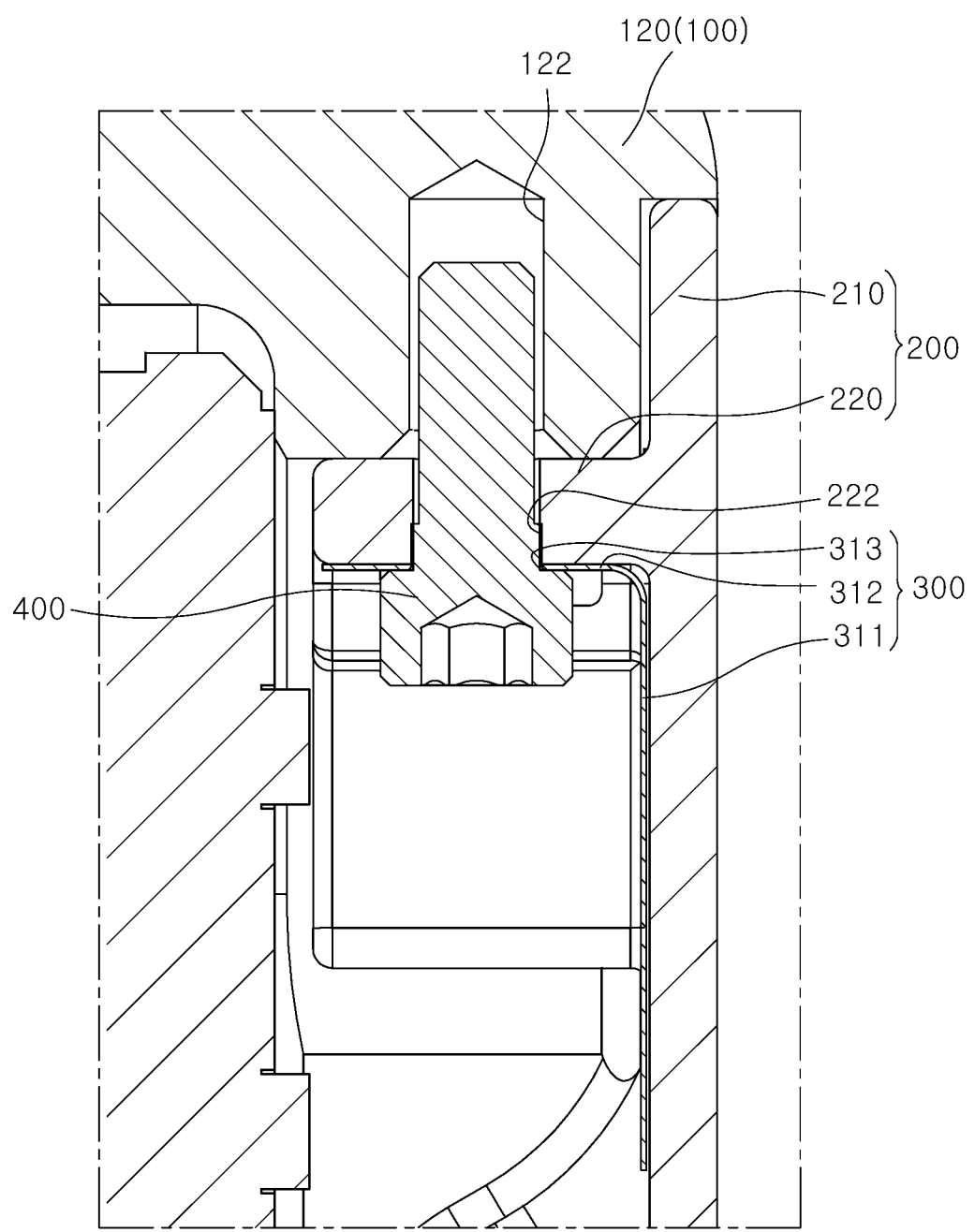
FIG. 6 is an expanded view of a portion C of FIG. 5.
Figure 7:
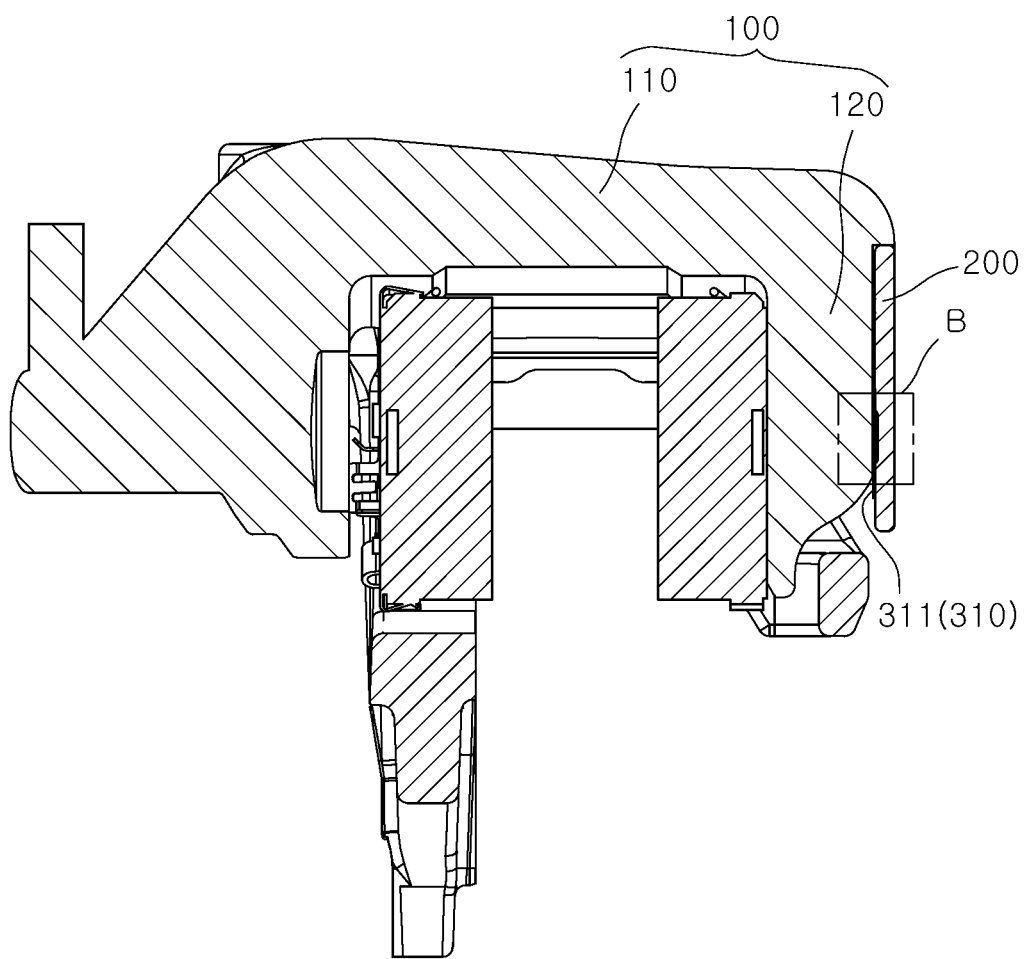
FIG. 7 is a cross-sectional view of the caliper noise prevention device for a vehicle brake in accordance with the first embodiment of the present invention, taken along the line B-B of FIG. 1.
Figure 8:
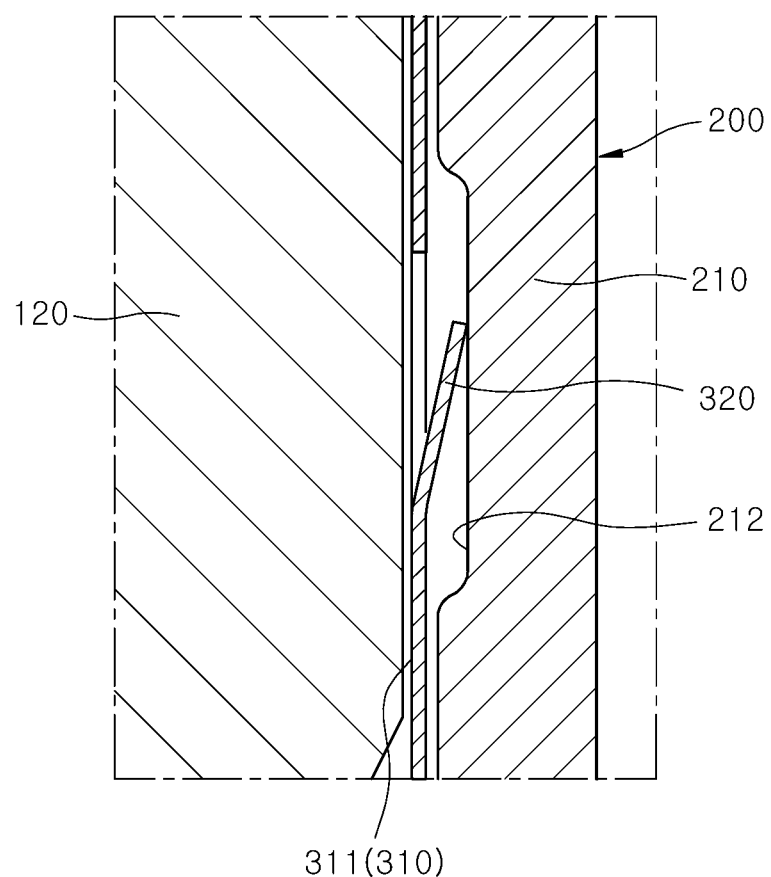
FIG. 8 is an expanded view of a portion B of FIG. 7.
Figure 9A:
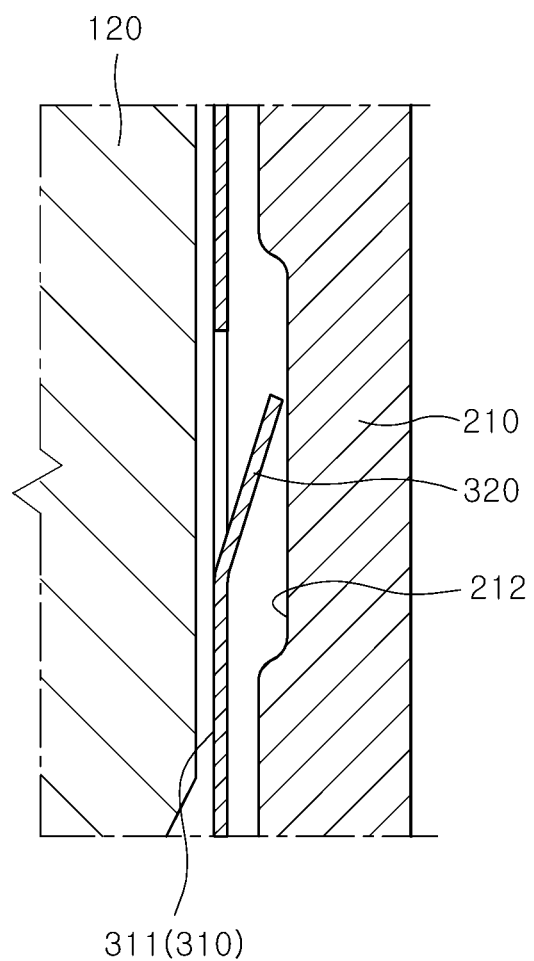
FIGS. 9A and 9B illustrate a coupling process of a spacer in the caliper noise prevention device for a vehicle brake in accordance with the first embodiment of the present invention.
Figure 9B:
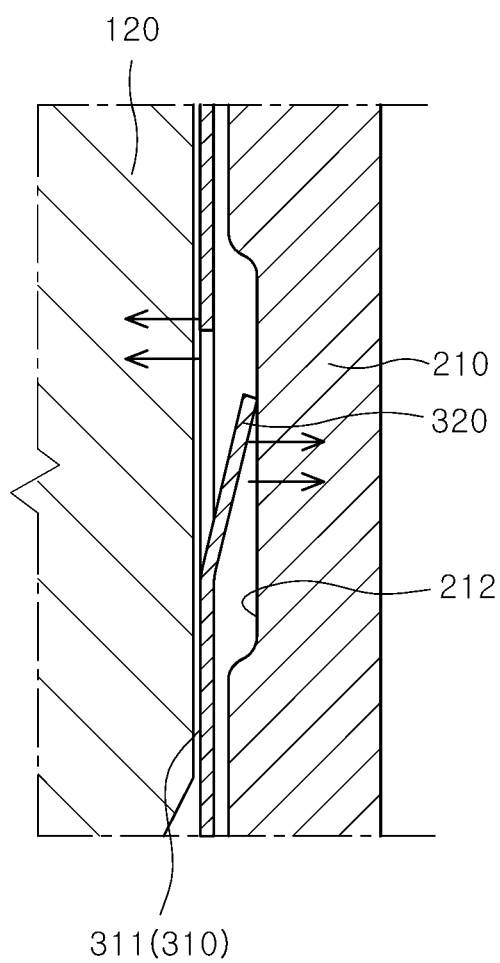
Figure 10:
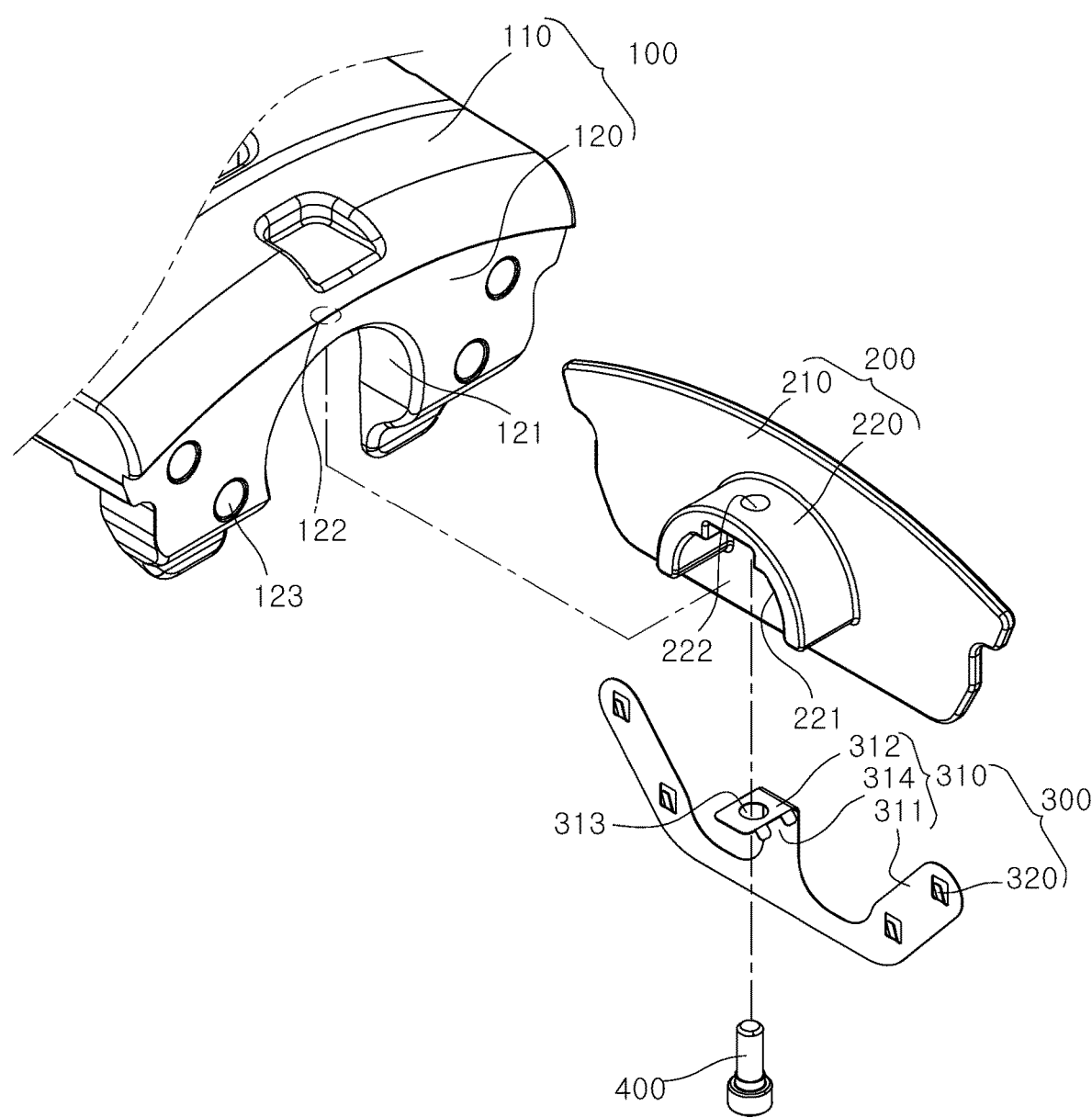
FIG. 10 is an expanded exploded perspective view of a caliper noise prevention device for a vehicle brake in accordance with a second embodiment of the present invention.
Figure 11:
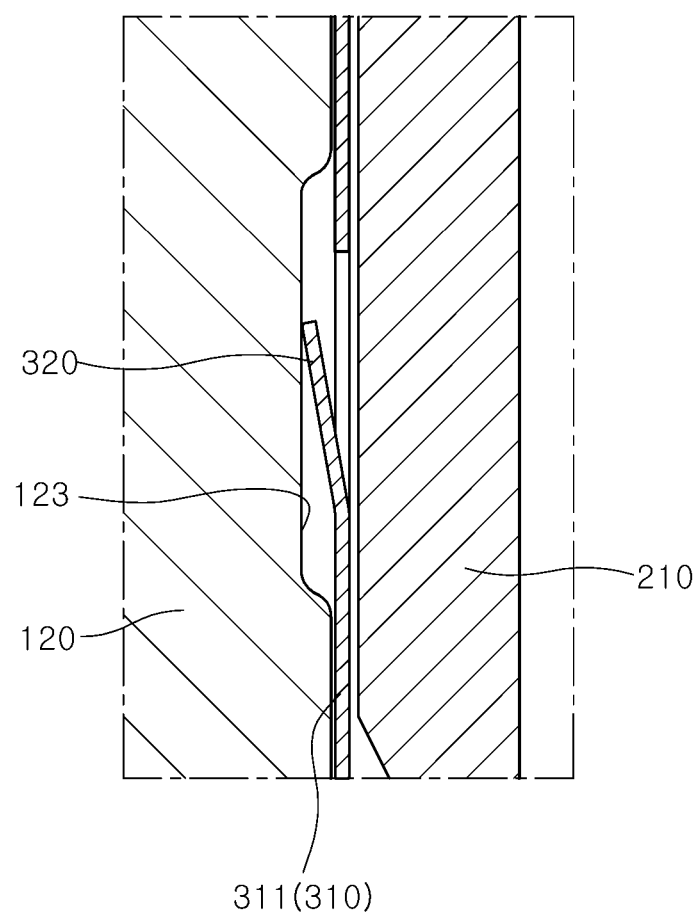
FIG. 11 is a cross-sectional view of main parts of the caliper noise prevention device for a vehicle brake in accordance with the second embodiment of the present invention.
Figure 12:
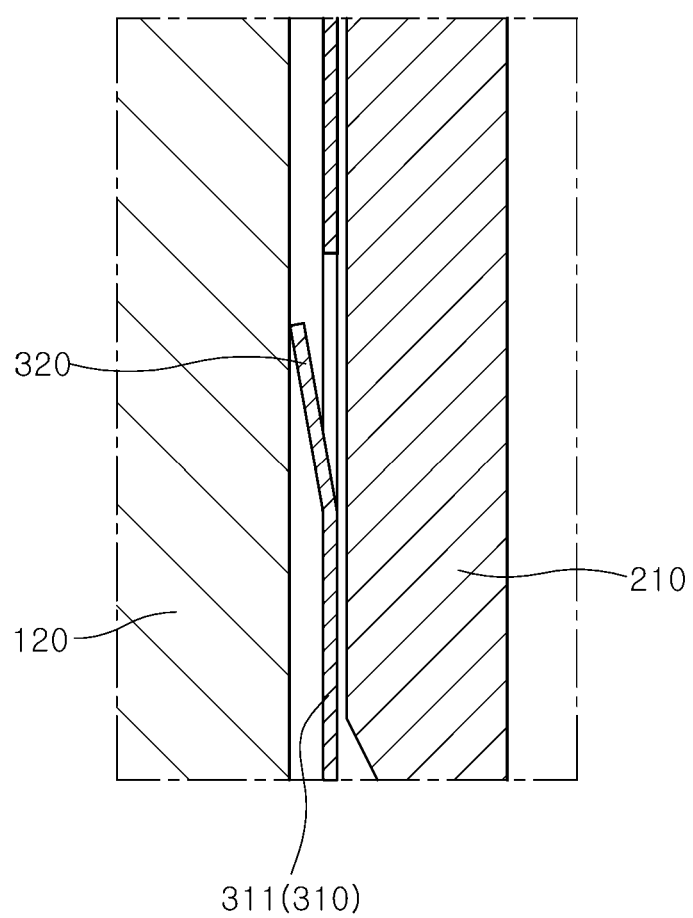
FIG. 12 is a cross-sectional view of main parts of a caliper noise prevention device for a vehicle brake in accordance with a third embodiment of the present invention.
Figure 13:
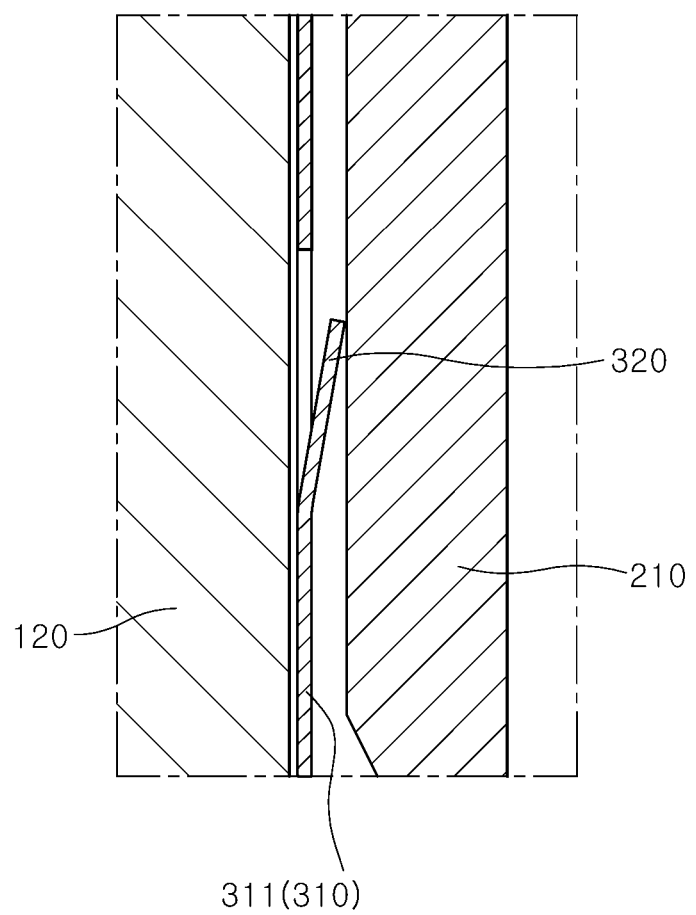
FIG. 13 is a cross-sectional view of main parts of a caliper noise prevention device for a vehicle brake in accordance with a fourth embodiment of the present invention.

FIG. 1 is a perspective view of a caliper noise prevention device for a vehicle brake in accordance with an embodiment of the present invention, FIG. 2 is an exploded perspective view of a caliper noise prevention device for a vehicle brake in accordance with a first embodiment of the present invention, FIG. 3 is an exploded perspective view of main parts of the caliper noise prevention device for a vehicle brake in accordance with the first embodiment of the present invention, FIG. 4 is an exploded perspective view of the caliper noise prevention device for a vehicle brake in accordance with the first embodiment of the present invention, when seen from the bottom, FIG. 5 is a cross-sectional view of the caliper noise prevention device for a vehicle brake in accordance with the first embodiment of the present invention, taken along the line A-A of FIG. 1, FIG. 6 is an expanded view of a portion C of FIG. 5, FIG. 7 is a cross-sectional view of the caliper noise prevention device for a vehicle brake in accordance with the first embodiment of the present invention, taken along the line B-B of FIG. 1, FIG. 8 is an expanded view of a portion D of FIG. 7, FIG. 9 illustrates a coupling process of a spacer in the caliper noise prevention device for a vehicle brake in accordance with the first embodiment of the present invention, FIG. 10 is an expanded exploded perspective view of a caliper noise prevention device for a vehicle brake in accordance with a second embodiment of the present invention, FIG. 11 is a cross-sectional view of main parts of the caliper noise prevention device for a vehicle brake in accordance with the second embodiment of the present invention, FIG. 12 is a cross-sectional view of main parts of a caliper noise prevention device for a vehicle brake in accordance with a third embodiment of the present invention, and FIG. 13 is a cross-sectional view of main parts of a caliper noise prevention device for a vehicle brake in accordance with a fourth embodiment of the present invention.

Referring to FIGS. 1 to 4, the caliper noise prevention device 1 for a vehicle brake in accordance with the first embodiment of the present invention may include a caliper body 100, a plate 200, a spacer 300 and a coupling 400.

The caliper body 100 may be coupled to a torque member 20 having a friction pad 10 installed therein. The torque member 20 may serve to press the friction pad 10 against a wheel disc (not illustrated) in order to brake a vehicle.

The plate 200 may be disposed so as to face the caliper body 100, and have vehicle information 211 printed thereon. The vehicle information 211 may include the emblem of a brake manufacturer or the like.

The spacer 300 may be disposed between the caliper body 100 and the plate 200, and isolate the caliper body 100 and the plate 200 from each other using its elastic restoring force. That is, the spacer 300 may isolate the caliper body 100 and the plate 200 from each other, and maintain the isolated state. The spacer 300 may be installed as a plate spring between the caliper body 100 and the plate 200, and prevent a contact between the caliper body 100 and the plate 200, which may be caused by vibration generated during braking or driving of the vehicle. Therefore, although vibration may occur when the vehicle is braked or driven, an occurrence of noise can be prevented while a contact between the caliper body 100 and the plate 200 is prevented by the spacer 300.

The coupling 400 may couple the spacer 300, the plate 200 and the caliper body 100 to one another. With the spacer 300 disposed between the caliper body 100 and the plate 200, a bolt of the coupling 400 may be coupled to a coupling groove 122 of the caliper body 100 through a second coupling hole 313 of the spacer 300 and a first coupling hole 222 of the plate 200. Thus, the spacer 300, the plate 200 and the caliper body 100 may be coupled together as one body.

As illustrated in FIGS. 3 and 4, the caliper body 100 may include a caliper body part 110 and a first installation part 120. The caliper body part 110 may be disposed so as to face the torque member 20, and coupled to the torque member 20. The first installation part 120 may be bent and extended from the caliper body part 110 so as to face the plate 200, and have a first installation groove 121 into which the plate 200 is inserted. At this time, the first installation groove 121 may be formed in a shape corresponding to a second installation part 220 of the plate 200. Thus, the plate 200 may be coupled to the caliper body 100. The coupling groove 122 may be formed in the first installation part 120 so as to communicate with the first installation groove 121.

The plate 200 may include a plate body 210 and a second installation part 220. The plate body 210 may be disposed so as to face the first installation part 120. The second installation part 220 may be extended toward the first installation groove 121 of the caliper body part 110. The second installation part 220 has a second installation groove 221 into which the spacer 300 is inserted. The first coupling hole 222 may be formed in the second installation part 220 so as to communicate with the second installation groove 221.

The spacer 300 may include first and second spacer portions 310 and 320. The first spacer portion 310 may be disposed between the caliper body 100 and the plate 200. The second spacer portion 320 may be extended from the first spacer portion 310 toward one side.

The first spacer portion 310 may be brought in contact with any one of the caliper body 100 and the plate 200, the second spacer portion 320 may be brought in contact with the other of the caliper body 100 and the plate 200, and the first and second spacer portions 310 and 320 may elastically support the caliper body 100 and the plate 200 so as to isolate the caliper body 100 and the plate 200 from each other. The second spacer portion 320 may be extended in the opposite direction of the first spacer portion 310.

The first spacer portion 310 may include a first spacer portion body 311, a coupling piece 312, and a connection piece 314. The first spacer portion body 311 may include a plurality of second spacer portions 320. The first spacer portion body 311 may be disposed in a plate shape between the caliper body 100 and the plate 200. The plurality of second spacer portions 320 included in the first spacer portion body 311 may be extended toward the plate 200 so as to come in contact with the plate 200 (refer to FIGS. 3 and 8).

Specifically, when the spacer 300, the plate 200 and the caliper body 100 are coupled to one another, the first and second spacer portions 310 and 320 may elastically support the caliper body 100 and the plate 200, respectively (refer to FIGS. 9A and 9B). Therefore, the caliper body 100 and the plate 200 may be isolated from each other by the spacer 300 so as to maintain a space therebetween. Therefore, since the caliper body 100 and the plate 200 does not come in contact with each other even though vibration is generated during braking or driving of the vehicle, an occurrence of noise can be prevented while a contact between the caliper body 100 and the plate 200 is prevented.

The coupling piece 312 may be formed in a plate shape, and the second coupling hole 313 may be formed at a position facing the first coupling hole 222 of the plate 200. The coupling piece 312 and the connection piece 314 may be inserted into the second installation groove 221, and the second coupling hole 313 may be disposed so as to face the first coupling hole 222. Therefore, the coupling 400 may be easily coupled to the coupling groove 122 through the second coupling hole 313 and the first coupling hole 222. The connection piece 314 may be disposed between the first spacer portion body 311 and the coupling piece 312, and connect the first spacer portion body 311 and the coupling piece 312 to each other.

The first spacer portion body 311 may be vertically symmetrical with respect to the connection piece 314, and the plurality of second spacer portions 320 included in the first spacer portion body 311 may be disposed in the longitudinal direction (FIGS. 3 and 10) so as to be isolated from each other. Therefore, the spacer 300 may elastically support the caliper body 100 and the plate 200 across the entire surfaces thereof.

The first spacer portion 310 may come in contact with the caliper body 100, and the second spacer portions 320 may be extended toward the plate 200 so as to come in contact with the plate 200. Therefore, the caliper body 100 and the plate 200 may be elastically supported by the spacer 300, such that a space between the caliper body 100 and the plate 200 can be maintained.

The plate 200 may include an insertion groove 212 in which the second spacer portion 320 is mounted. Therefore, when the first spacer portion 310 is disposed between the caliper body 100 and the plate 200, the position of the second spacer portion 320 may be fixed while the second spacer portion 320 is inserted into the insertion groove 212. Therefore, although vibration is generated during braking or driving of the vehicle, the spacer 300 can be prevented from moving from the preset space.

FIGS. 1 to 9 illustrate that the plate 200 has the insertion groove 212 formed therein. As illustrated in FIG. 13, however, the second spacer portion 320 may not be inserted into the insertion groove 212, but brought in direct contact with the plate body 210 of the plate 200.

The caliper body 100 may have the coupling groove 122 formed therein, and the plate 200 may have the first coupling hole 222 formed at a position facing the coupling groove 122. Specifically, the coupling groove 122 may communicate with the first installation groove 121 formed in the first installation part 120 of the caliper body 100. The first coupling hole 222 may communicate with the second installation groove 221 formed in the second installation part 220 of the plate 200. When the second installation part 220 of the plate 200 is inserted into the first installation groove 121 of the caliper body 100, the coupling groove 122 and the first coupling hole 222 may be connected to each other while facing each other.

The spacer 300 may have the second coupling hole 313 formed at a position facing the first coupling hole 222, and the coupling 400 may be coupled to the coupling groove 122 through the second coupling hole 313 and the first coupling hole 222. Specifically, the second coupling hole 313 may be formed in the coupling piece 312 of the spacer 300. When the spacer 300 is inserted into the second installation part 220 of the plate 200, the second coupling hole 313 and the first coupling hole 222 may be connected to each other while facing each other. That is, the coupling groove 122, the first coupling hole 222 and the second coupling hole 313 are arranged in a line so as to be connected to each other.

Therefore, as the coupling 400 is coupled to the coupling groove 122 through the second coupling hole 313 and the first coupling hole 222, the caliper body 100, the plate 200 and the spacer 300 may be coupled to each other as one body.

Hereafter, the operation and effect of the caliper noise prevention device for a vehicle brake in accordance with the first embodiment of the present invention will be described with reference to FIGS. 9A and 9B.

In order to prevent an occurrence of noise between the caliper body 100 and the plate 200, an operator may dispose the spacer 300 between the caliper body 100 and the plate 200 so as to couple the caliper body 100, the plate 200 and the spacer 300 to one another.

Specifically, the operator may insert the spacer 300 into the second installation groove 221 of the plate 200, and then insert the second installation part 220 of the plate 200 into the first installation groove 121 of the caliper body 100. Then, the operator may couple the coupling 400 to the coupling groove 122 of the caliper body 100 through the second coupling hole 313 of the spacer 300 and the first coupling hole 222 of the plate 200. Therefore, the caliper body 100, the plate 200 and the spacer 300 may be coupled to one another.

As such, when the spacer 300, the plate 200 and the caliper body 100 are coupled to one another, the first and second spacer portions 310 and 320 may elastically support the caliper body 100 and the plate 200, respectively (refer to FIGS. 9A and 9B). Therefore, the caliper body 100 and the plate 200 may be isolated from each other so as to maintain a space therebetween. Therefore, since the caliper body 100 and the plate part 200 do not come in contact with each other even though vibration is generated during braking or driving of the vehicle, an occurrence of noise can be prevented while a contact between the caliper body 100 and the plate 200 is prevented.

Hereafter, a caliper noise prevention device for a vehicle brake in accordance with a second embodiment of the present invention will be described. In the second embodiment, the detailed descriptions of the same components as those of the first embodiment are omitted herein.

Referring to FIGS. 10 and 11, the first spacer portion 310 may be brought in contact with the plate 200, and the second spacer portion 320 may be extended toward the first spacer portion 310 so as to come in contact with the caliper body 100.

Specifically, the first spacer portion 310 may be brought in contact with the plate body 210 of the plate 200, and the second spacer portion 320 may be extended from the first spacer portion body 311 of the first spacer portion 310 toward the caliper body 100 so as to come in contact with the first installation part 120 of the caliper body 100. Therefore, when the spacer 300, the plate 200 and the caliper body 100 are coupled to one another, the caliper body 100 and the plate 200 may be isolated from each other while being elastically supported by the first and second spacer portions 310 and 320, respectively. That is, a space can be retained between the caliper body 100 and the plate 200. Therefore, since the caliper body 100 and the plate 200 do not come in contact with each other even though vibration is generated during braking or driving of the vehicle, an occurrence of noise can be prevented while a contact between the caliper body 100 and the plate 200 is prevented.

The caliper body 100 may have an insertion groove 123 into which the second spacer portion 320 is inserted. Therefore, when the first spacer portion 310 is disposed between the caliper body 100 and the plate 200, the position of the second spacer portion 320 may be fixed while the second spacer portion 320 is inserted into the insertion groove 123. Therefore, although vibration is generated during braking or driving of the vehicle, the spacer 300 can be prevented from moving from the preset space.

FIGS. 10 to 11 illustrate that the caliper body 100 has the insertion groove 123 formed therein. As illustrated in FIG. 12, however, the second spacer portion 320 may not be inserted into the insertion groove 123, but brought in direct contact with the caliper body part 120 of the caliper body 100.

Since the operation and effect of the caliper noise prevention device for a vehicle brake in accordance with the second embodiment of the present invention are the same as those of the first embodiment, the descriptions thereof are omitted herein.

In accordance with the embodiment of the present invention, the caliper noise prevention device for a vehicle brake can noise between the caliper body and the plate through the spacer during braking or driving of the vehicle, the spacer being disposed between the caliper body and the plate and retaining a space between the caliper body and the plate using its elastic restoring force.

Furthermore, since the first spacer portion body includes the plurality of second spacer portions which are disposed in a longitudinal direction so as to be isolated from each other, the spacer may elastically support the caliper body and the plate across the entire surfaces.

Furthermore, the plate or the caliper body may have the insertion groove into which the second spacer portion is inserted. Therefore, when the first spacer portion is disposed between the caliper body and the plate, the position of the second spacer portion may be fixed while the second spacer portion is inserted into the insertion groove. Thus, although vibration is generated during braking or driving of the vehicle, the spacer can be prevented from moving from the preset space.

Although exemplary embodiments of the present disclosure have been shown and described hereinabove, the present disclosure is not limited to specific exemplary embodiments described above, but may be various modified by those skilled in the art to which the present disclosure pertains without departing from the scope and spirit of the disclosure as disclosed in the accompanying claims. In addition, such modifications should also be understood to fall within the scope and spirit of the present disclosure.

What is claimed is:

1. A caliper noise prevention device for a vehicle brake, comprising:
    a caliper body coupled to a torque member comprising a friction pad installed therein;
    a plate disposed to face the caliper body;
    a spacer disposed between the caliper body and the plate, and positioned to isolate the caliper body and the plate from each other with an elastic restoring force; and
    a coupling configured to couple the spacer, the plate and the caliper body to one another,
    wherein the spacer comprises:
        a first spacer portion, wherein the plate is disposed between the caliper body and the first spacer portion and the first spacer portion is configured to be in contact with the plate; and
        a plurality of second spacer portions, wherein each of the plurality of second spacer portions extends from the first spacer portion toward the caliper body to be in contact with the caliper body.

2. The caliper noise prevention device of claim 1, wherein the first spacer portion is configured to elastically support the plate, and each of the plurality of second spacer portions is configured to elastically support the caliper body, in order to isolate the caliper body and the plate from each other.

3. The caliper noise prevention device of claim 2, wherein the first spacer portion comprises:
    a first spacer portion body comprising the plurality of second spacer portions formed thereon;
    a coupling piece comprising a second coupling hole formed at a position facing a first coupling hole of the plate; and
    a connection piece disposed between the first spacer portion body and the coupling piece, and connecting the first spacer portion body and the coupling piece to each other.

4. The caliper noise prevention device of claim 3, wherein the first spacer portion body is symmetrically formed with respect to the connection piece.

5. The caliper noise prevention device of claim 4, wherein the first spacer portion body comprises the plurality of second spacer portions which are disposed to be isolated from each other.

6. The caliper noise prevention device of claim 5, wherein the plurality of second spacer portions are arranged in a longitudinal direction in a line on the first spacer portion body.

7. The caliper noise prevention device of claim 1, wherein the plate comprises an insertion groove, wherein at least one of the second spacer portions is inserted into the insertion groove.

8. The caliper noise prevention device of claim 1, wherein the caliper body comprises another insertion groove, wherein at least one of the second spacer portions is inserted into the another insertion groove.

* * * * *